United States Patent
Champaney

(10) Patent No.: US 8,873,587 B2
(45) Date of Patent: Oct. 28, 2014

(54) COMMUNICATION METHOD USING TIME-DIVISION MULTIPLEXING

(75) Inventor: Pascal Champaney, Le Touvet (FR)

(73) Assignee: Adeunis RF, Crolles (FR)

( * ) Notice: Subject to any disclaimer, the term of this patent is extended or adjusted under 35 U.S.C. 154(b) by 95 days.

(21) Appl. No.: 13/380,105

(22) PCT Filed: Jun. 22, 2010

(86) PCT No.: PCT/FR2010/000456
§ 371 (c)(1),
(2), (4) Date: Dec. 22, 2011

(87) PCT Pub. No.: WO2010/149874
PCT Pub. Date: Dec. 29, 2010

(65) Prior Publication Data
US 2012/0093177 A1 Apr. 19, 2012

(30) Foreign Application Priority Data

Jun. 23, 2009 (FR) ...................... 09 03040

(51) Int. Cl.
*H04J 3/06* (2006.01)
*H04W 74/08* (2009.01)
*H04W 72/02* (2009.01)
*H04W 28/26* (2009.01)
*H04W 24/00* (2009.01)

(52) U.S. Cl.
CPC .......... *H04W 74/0875* (2013.01); *H04J 3/0605* (2013.01); *H04W 72/02* (2013.01); *H04W 28/26* (2013.01); *H04W 24/00* (2013.01)
USPC ....................................... 370/503

(58) Field of Classification Search
USPC ....................................... 370/503
See application file for complete search history.

(56) References Cited

U.S. PATENT DOCUMENTS

| | | | | |
|---|---|---|---|---|
| 5,166,675 A * | 11/1992 | Amemiya et al. | ........... | 340/3.51 |
| 5,544,075 A * | 8/1996 | Janex | ............ | 370/230 |
| 5,889,767 A * | 3/1999 | Kimura | ......... | 370/314 |
| 6,111,889 A * | 8/2000 | Osada | ........ | 370/461 |
| 6,747,976 B1 * | 6/2004 | Bensaou et al. | ........... | 370/395.4 |
| 7,848,289 B2 * | 12/2010 | Jose | ............ | 370/330 |
| 2002/0012362 A1 * | 1/2002 | Yahata et al. | ........ | 370/503 |
| 2004/0185779 A1 * | 9/2004 | Boetzel et al. | ........... | 455/41.3 |
| 2009/0003306 A1 * | 1/2009 | Plutov et al. | .......... | 370/348 |
| 2009/0168797 A1 * | 7/2009 | Danielson et al. | ........... | 370/458 |

FOREIGN PATENT DOCUMENTS

| EP | 0 635 959 A1 | 1/1995 |
|---|---|---|
| EP | 1 843 326 A1 | 10/2007 |

OTHER PUBLICATIONS

International Search Report in International Application No. PCT/FR2010/000456; dated Nov. 19, 2010 (with English-language translation).

\* cited by examiner

*Primary Examiner* — Asad Nawaz
*Assistant Examiner* — Syed S Ali
(74) *Attorney, Agent, or Firm* — Oliff PLC

(57) ABSTRACT

A communication method using time-division multiplexing that enables permanent communication between user terminals. One of the terminals is a master terminal, the others being slave terminals. The transmission channel is divided into frames, each frame being divided into time slots. Each slave terminal identifies a free time slot in the current frame, in listening mode, and transmits data in the identified time slot, in transmission mode, during at least one following frame. As soon as the slave terminal ceases transmitting, the identified time slot becomes free again.

6 Claims, 5 Drawing Sheets

| TS 1 | TS 2 | TS 3 | TS 4 | TS 5 | TS 6 |
|---|---|---|---|---|---|
| Sync<br>U1 = U-Master | Sync2<br>U2 | | | | |

Fig. 5

| TS 1 | TS 2 | TS 3 | TS 4 | TS 5 | TS 6 |
|---|---|---|---|---|---|
| Sync<br>U-Master | PRIO=1 | PRIO=1 | PRIO=1 | PRIO=1 | PRIO=1 |

Fig. 6A

| TS 1 | TS 2 | TS 3 | TS 41 | TS 42 | TS 51 | TS 52 | TS 61 | TS 62 |
|---|---|---|---|---|---|---|---|---|
| Sync<br>U-Master | DATA U1 | DATA U2 | PRIO=2 | PRIO=2 | PRIO=2 | PRIO=2 | PRIO=2 | PRIO=2 |

| TS 1 | TS 2 | TS 3 | TS 41 | TS 42 | TS 51 | TS 52 | TS 61 | TS 62 | TS 63 |
|---|---|---|---|---|---|---|---|---|---|
| Sync U-Master | DATA U1 | DATA U2 | DATA U3 | DATA U4 | DATA U5 | DATA U6 | PRIO=3 | PRIO=3 | PRIO=3 |

Fig. 6C

COMMUNICATION METHOD USING TIME-DIVISION MULTIPLEXING

BACKGROUND OF THE INVENTION

The invention relates to a communication method by time-division multiplexing between a master terminal and several slave terminals.

STATE OF THE ART

As radio frequencies are being increasingly solicited, solutions for increasing the density of communications are envisaged. Communication methods using time-division multiple access are commonly used, in particular in mobile telephony. Time Division Multiple Access (TDMA) is a time-based multiplexing mode enabling several digital signals to be transmitted on the same frequency channel. Several users thus share the same channel. The data flow is generally divided into frames. Each frame is divided into several time slots. The users transmit data successively using their own time slot.

FIG. 1 illustrates an example of TDMA time-sharing between several users, here three users: U1, U2 and U3. Each time slot is assigned to a user by a master unit UM, for example a base station, on completion of a dialogue taking place on a service channel (not shown). All the communications transit via this master unit. This technology generally uses two frequency bands, one for the uplink 1, i.e. to transmit the data from the users to the master, and the other for the downlink 2, i.e. from the master to the users. Each channel comprises a succession of frames 3 each divided into several time slots 4. For example, in FIG. 1, frame 3 is divided into six time slots 4. This technology is used for example in mobile telephony by the GSM/GPRS/EDGE standard.

European patent application EP1843326 describes a multiuser wireless communication system with time-division multiplexing. In this system, communication by radio link between all the users is permanent and the users communicate for example in audio conference mode or in data transmission mode by means of request and acknowledgement.

FIG. 2 illustrates the communication method implemented in this patent application. All the users (U1 to U3), equipped with respective terminals, can communicate with one another and each of them hears the exchanges of the others. The method uses a single frequency band 5. A time slot is associated with each terminal, and the terminal transmits in this time slot. The terminal is in reception mode in the other time slots. For example, while the terminal of user U1 is transmitting in its time slot TS1, it is listened to by the other two users. It then successively listens to the terminal of user U2 during time slot TS3, and then to U3 during time slot TS5.

One of the terminals (U1 in FIG. 2) performs the master function to synchronize the other terminals, which have become slaves, and thus occupies its own time slot with a synchronization signal.

This system enables conversations of conference type to be held on a single transmission channel 5. Furthermore, this communication system is not dependent on correct operation of the master. As the master is in fact any user terminal, it can be replaced by another terminal in case of malfunction.

This system is nevertheless limited by the number of possible users on account of the limited number of time slots 4, each time slot being dedicated to a terminal.

European patent application EP0635959 describes a method for optimizing the communication channel used in air traffic control systems. According to this technique, each participating mobile identifies the free time slots in a listening period, and then randomly chooses one of the free time slots in order to transmit. Each mobile is synchronized on a common clock by means of a master station which systematically occupies one slot per period. The mobile quits the channel at the end of transmission.

Nevertheless, this method can prove unsuitable for management of a large number of terminals. When all the time slots are occupied, access to the network by a terminal having an urgent need to transmit is in fact difficult. There is therefore a risk of priority data not being transmitted within the necessary time.

OBJECT OF THE INVENTION

The object of the invention is to provide a communication method that is simple and easy to implement, enabling communication between any large number of terminals while at the same time guaranteeing access to the network for priority data.

This object is achieved by that data transmission is performed in successive frames, each frame being divided into a plurality of time slots, one of the time slots of each frame being reserved for the master terminal to transmit a synchronization signal. Each terminal is either in transmission mode or in listening mode during each time slot. Each slave terminal selects a free time slot in the current frame in listening mode and transmits data in transmission mode during at least one following frame, in the selected time slot, the selected time slot becoming free as soon as the slave terminal ceases transmitting. Each slave terminal assigns a priority level to the different free time slots of the frame, only selects a time slot for transmission if the priority level of the time slot is sufficiently low and assigns priority levels varying according to the number of free time slots.

BRIEF DESCRIPTION OF THE DRAWINGS

Other advantages and features will become more clearly apparent from the following description of particular embodiments of the invention, given for non-restrictive example purposes only and represented in the appended drawings in which:

FIG. 5 represents a step of an alternative embodiment of the method according to FIGS. 3A to 3D, and FIGS. 6A to 6C represent steps of another embodiment of the method according to the invention.

DESCRIPTION OF PARTICULAR EMBODIMENTS

Figure 1:
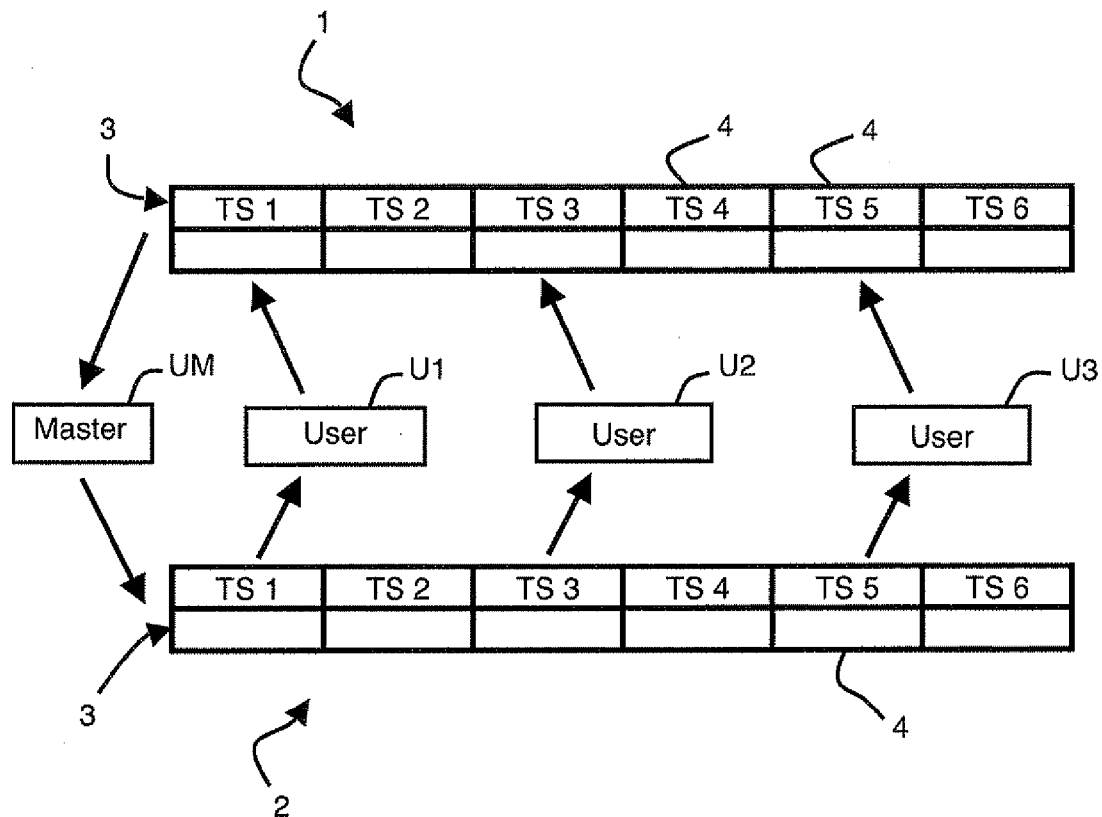
FIG. 1 schematically represents a communication method according to the prior art, FIG. 2 schematically represents another communication method according to the prior art.
Figure 2:
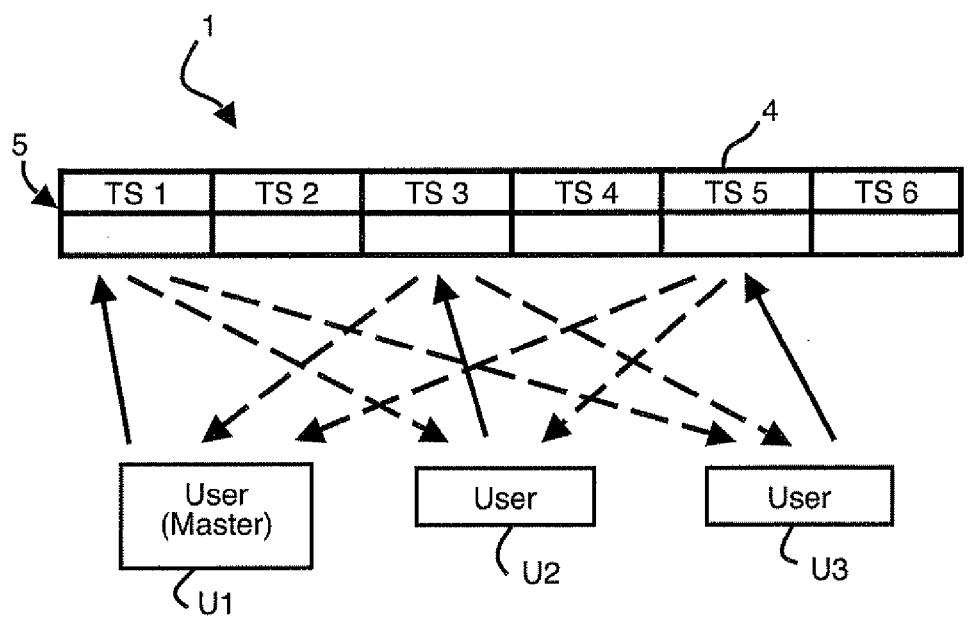

FIGS. 3A to 3D represents steps, for example purposes, of a first embodiment of a communication method according to the invention. This method comprises similarities with the method described in relation with FIG. 2. The novelty resides in the fact that the time slots of the frames are not reserved for respective terminals and that the number of terminals, or communication nodes, can be greater than the number of slots of a frame.

Figure 3A:
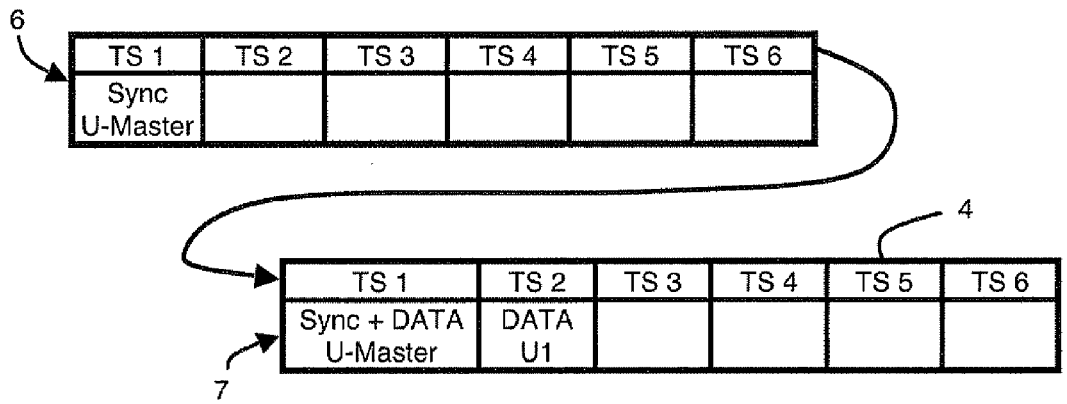
FIGS. 3A to 3D represents several steps for example purposes of a first embodiment of a communication method according to the invention.

FIG. 3A represents two successive frames of a communication. The current frame 6 is empty, except the synchronization signal Sync from the master terminal U-Master. In the examples described here, the first time slot TS1 is reserved for the master terminal, in which the master permanently transmits at least synchronization signal Sync. The primary function of a master terminal is to perform synchronization, i.e. to indicate the limits of each frame to the slave terminals. Any terminal can perform the function of master and use any time slot provided that it is the only one having this role at a given time.

Time slots TS2 to TS6 are free in the current frame, i.e. no slave terminal is transmitting in one of these time slots. As each slave terminal listens to the other terminals, it knows the occupation of time slots 4 in the current frame 6. It can therefore identify a free time slot in listening mode, and transmit data in the identified time slot, in transmission mode, during at least a following frame 7. Thus, in the example of FIG. 3A, time slot TS2 of the current frame 6 has been identified as being free by the terminal of user U1, and this terminal can therefore transmit its data 'DATA' in this time slot during the next frame 7. So long as it has data to transmit, the terminal keeps time slot TS2 and transmits subsequent frames (not shown) in the same time slot. If the master terminal takes part in the communication and has data to transmit, it transmits its data 'DATA' in its own time slot (TS1), in addition to synchronization signal Sync, as is represented in the following frame 7.

If, during a frame, several terminals identify the same free time slot, they may enter into collision by transmitting simultaneously in this time slot. As the analog signals are superposed in the time slot, only the strongest signal will be received. This collision is managed by means of a conventional transmission protocol, such as the handshake protocol.

For example, in data transmission, transmission is intended for one of the terminals which returns a receipt acknowledgement. Thus, the terminal in collision whose transmission has not been received will not receive the receipt acknowledgement which is intended for it and will retransmit its data. In audio mode, it can be provided for the master terminal to perform acknowledgement of transmissions from the slave terminals. The terminal in collision therefore not having received a receipt acknowledgement from the master terminal proceeds with identification of a new free time slot to continue to transmit.

Figure 3B:
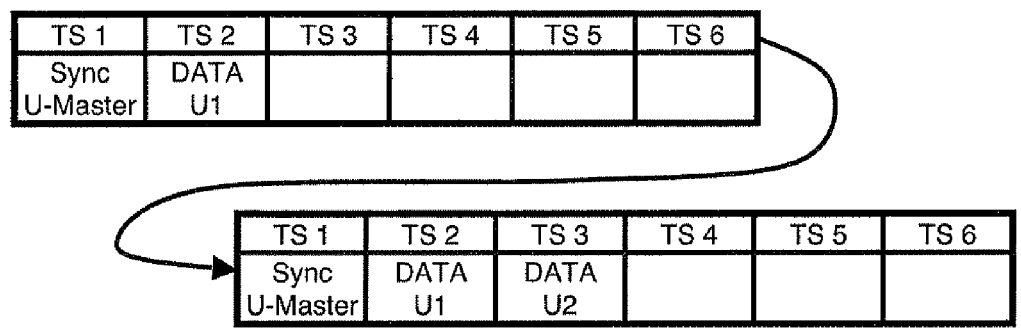

In FIG. 3B, a second user U2 takes the next free time slot TS3 to transmit. Two time slots (TS2 and TS3) are thus occupied by the terminals of users U1 and U2.

Figure 3C:
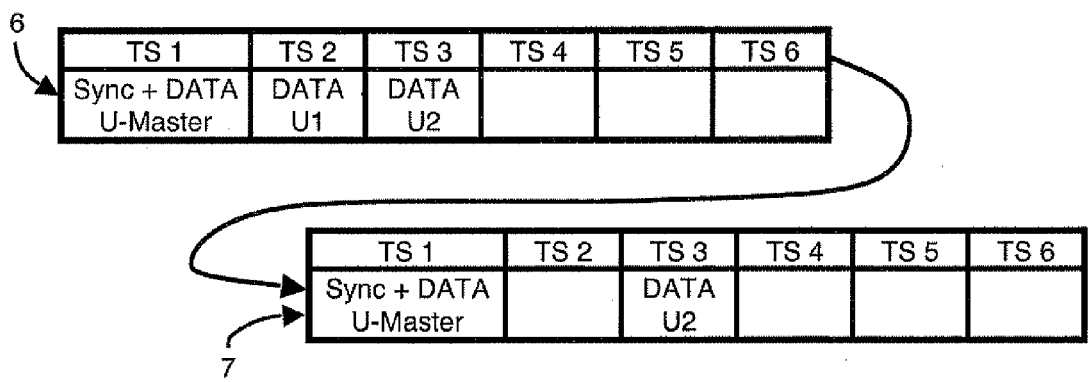

In FIG. 3C, the terminal of user U1 has no more data DATA to transmit. The time slot it occupies in the current frame 6 becomes free again in the next frame 7.

Figure 3D:
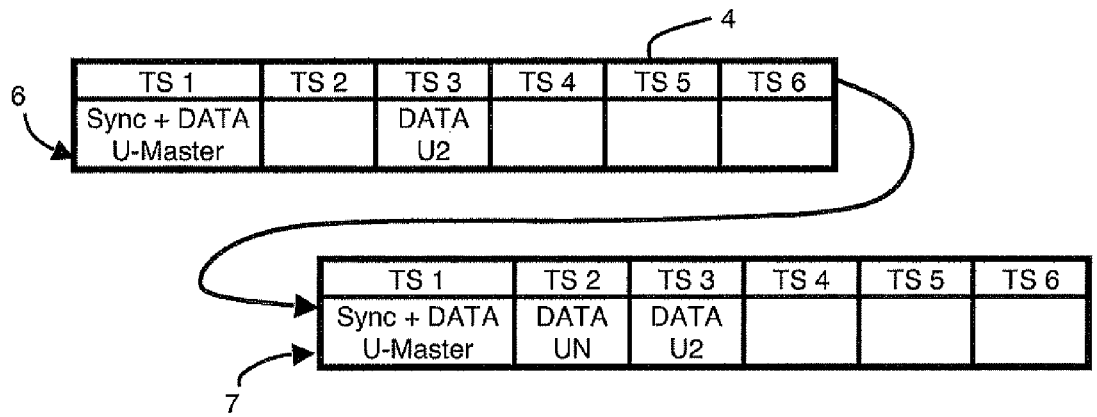

In FIG. 3D, if a new slave terminal UN has data to transmit, it identifies, during a listening phase, the time slot TS2 released in the current frame and transmits its data DATA in time slot TS2 of the following frames.

In numerous applications of audio conference type or data exchange using request and acknowledgement, the number of users may be high. The number of terminals, or communication nodes, that simultaneously transmit data is on the other hand generally low compared with the number of terminals which listen. A person cannot in fact concentrate on several simultaneous conversations. A network concentrator can likewise not receive data from several peripherals at the same time. Each slave terminal that needs to transmit therefore acts in opportunist manner reserving the first available time slot it sees. The method described above enables a small subset of a large number of users to take part in the communication. The number of terminals can therefore be greater than the number of time slots in a frame, provided that the number of terminals that transmit simultaneously remains lower than or equal to the number of time slots.

Figure 4A:
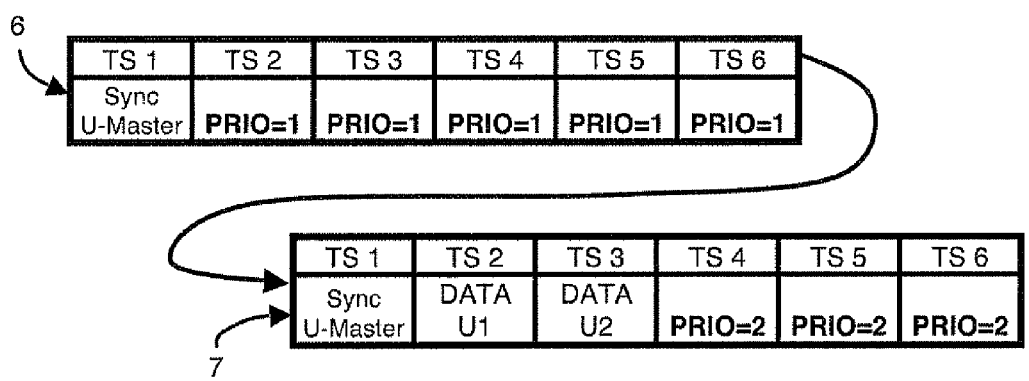
FIGS. 4A and 4B represent steps of a second embodiment of the method according to the invention.
Figure 4B:
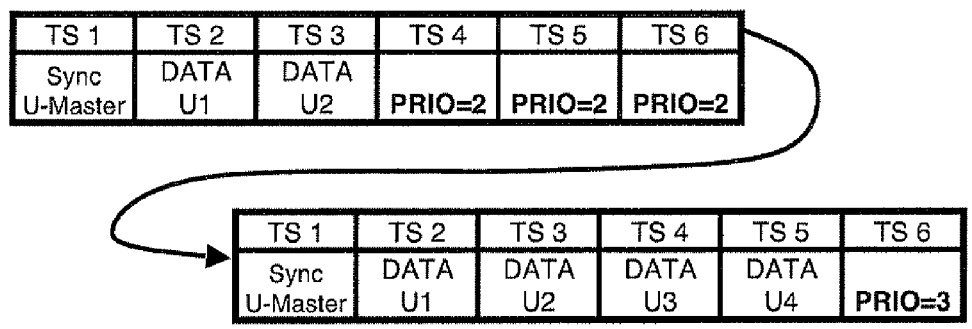

FIGS. 4A and 4B represent for example purposes steps of a second embodiment of the communication method. As terminals have more and more data to transmit, the availability of the time slots decreases. It is however possible for one of the slave terminals, having an urgent need to transmit data, to be confronted with an unavailable network.

In this embodiment, the method comprises a mechanism that enables the transmission channel to be made available for data that are judged to be priority data and thereby to prioritize access to the network.

Each slave terminal, knowing the number of free time slots at all times, itself determines a priority level of these time slots, for example by means of the same algorithm implemented in each terminal. A priority level is further assigned to each terminal, for example in fixed manner, programmed before its use. A terminal thus gives itself a time slot only if its priority level is higher than or equal to the priority level it has determined for the time slot.

When all the time slots are free, they have a minimum priority level. In the example of a FIG. 4A, this priority level is set to 1 (PRIO=1) for each free time slot in the current frame 6. Terminals of priority 1 or higher can then assign themselves any one of the free time slots. If, in the following frame 7, the number of free time slots decreases, the priority level of these free time slots increases (PRIO=2). Only terminals of priority 2 or higher will then be able to assign themselves these time slots.

In the example of FIG. 4B, the network is greatly solicited and there is for example only one remaining free time slot. Its priority level is set to the maximum to guarantee the availability of the time slot for a terminal with maximum priority, priority 3 for example.

Instead of assigning priorities to the terminals, priorities can be assigned to categories of data that each terminal can transmit. It can be envisaged that, except the human voice, a terminal can transmit signals, for example an alarm signal which would then have maximum priority.

It can further be envisaged to forcibly release a time slot used by a terminal of minimum priority. The newly released time slot will cause a new calculation of the priority levels of the free time slots and of the availability of the network to terminals of sufficient priority.

For example, a terminal of low priority, knowing the availability of the time slots at all times, can on its own initiative release the time slot it occupies if the network is saturated.

In certain applications, for example on a building site, one of the users may have an important role, for example the general foreman, and he must therefore have absolute priority over the others in communication. Such a user will receive the master terminal, as a time slot is reserved for it in each frame to transmit synchronization to the other terminals. It can however be envisaged for a second user to also be a priority user.

FIG. 5 illustrates a possibility to envisage this case. Each priority user terminal has a time slot that is reserved for it. For example, users U1 and U2 are judged to be priority users. The terminal of U1 is the master terminal. The terminal of U2 definitively assigns itself the time slot, TS2 for example. There are then only four free time slots, i.e. TS3 to TS6.

To indicate that the user is a priority user, his terminal transmits a synchronization signal Sync2 different from the synchronization signal of the master, in the reserved time slot TS2 of each frame, as represented in FIG. 5. This signal indicates to the other terminals that the time slot is unavailable, even if it does not contain data.

This mechanism is compatible with the access priority management described in the foregoing. The terminals sharing the remaining time slots will determine the priorities of these time slots as was explained in relation with FIGS. 4A and 4B.

In order to further improve the availability of the network, the method can comprise a step of dividing the free time slots into sub-time slots. The time slots are therefore shortened in order to increase their number. The volume of data of the sub-time slots is therefore reduced, but potentially a greater number of terminals can transmit in any one frame.

In the example of FIG. 6A, the frame initially comprises six time slots. The first one, TS1, is reserved for the master terminal, which can be a priority user terminal. Time slots TS2 to TS6 are associated with the secondary users. On account of the fact that, in FIG. 6A, time slots TS2 to TS6 are all free, the priority level of these time slots is minimum.

In FIG. 6B, time slots TS2 and TS3 are occupied by secondary users U1 and U2. The number of free time slots decreases and the priority level of these time slots is therefore incremented. These same time slots 4 are furthermore each divided into two sub-time slots 8. For example, time slot TS4, of priority 2, is divided into two sub-time slots TS41 and TS42, also of priority 2.

If the network becomes greatly solicited, i.e. if there is only for example a single free time slot, the latter can be divided into three sub-time slots TS61, TS62 and TS63 of maximum priority level, as illustrated in FIG. 6C.

Division of the time slots and the priority levels are determined by the same algorithm implemented in each terminal, for example at the level of the data routing protocol layers.

Numerous variants and modifications of the method described here will be apparent to the person skilled in the art. The system has been described in relation with wireless terminals designed to transmit the human voice. It is not excluded to use these principles in a network, which may be hardwired or not, to process data transmission between communication points. The term "terminal" should therefore be understood in this patent application as describing both equipment which interacts with the user during an audio communication and a communication point of an autonomous data exchange network.

The invention claimed is:

1. A communication method using time division multiplexing between a master terminal and several slave terminals, data transmission being performed in successive frames, each frame being divided into a plurality of time slots, one of the time slots of each frame being reserved for the master terminal to transmit a synchronization signal, and each terminal being either in transmission mode or in listening mode during each time slot,
   wherein a terminal priority level is assigned to each terminal or to categories of data that each terminal can transmit; and
   wherein each slave terminal performs, for each current frame, the steps of:
      checking the number of free time slots in said current frame;
      assigning a slot priority level to the different free time slots of said current frame by means of the same algorithm implemented in each terminal, wherein the slot priority level increases when the number of free time slots decreases;
      selecting, in listening mode, one free time slot of the current frame, only if the terminal priority level is higher than or equal to the slot priority level assigned by the terminal to said free time slot;
      transmitting, in transmission mode, data in the selected time slot during at least one following frame, said selected time slot becoming free as soon as the slave terminal ceases transmitting; and
   reserving a time slot for a priority user terminal throughout the communication; wherein
   each slave terminal of the priority user transmits in a corresponding time slot a priority synchronization signal different from the synchronization signal of the master terminal, the priority synchronization signal indicating a user of the slave terminal is the priority user and that the corresponding time slot is a reserved time slot unavailable to the other terminals.

2. The method according to claim 1, wherein a terminal of minimum priority forces release of the time slot it occupies, at its own initiative, when the frame is saturated.

3. The method according to claim 1, wherein the master terminal is a priority user terminal.

4. The method according to claim 1, comprising a step of dividing each free time slot into sub-time slots, each sub-time slot being available for a different terminal.

5. The method according to claim 4, wherein the number of sub-time slots per time slot increases when the number of free time slots decreases.

6. A communication method using time division multiplexing between a master terminal and several slave terminals, data transmission being performed in successive frames, each frame being divided into a plurality of time slots, one of the time slots of each frame being reserved for the master terminal to transmit a synchronization signal, and each terminal being either in transmission mode or in listening mode during each time slot,
   wherein a terminal priority level is assigned to each terminal or to categories of data that each terminal can transmit; and
   wherein each slave terminal performs, for each current frame, the steps of:
      checking the number of free time slots in said current frame;
      assigning a slot priority level to the different free time slots of said current frame by means of the same algorithm implemented in each terminal, wherein the slot priority level increases when the number of free time slots decreases;
      selecting, in listening mode, one free time slot of the current frame, only if the terminal priority level is higher than or equal to the slot priority level assigned by the terminal to said free time slot;
      transmitting, in transmission mode, data in the selected time slot during at least one following frame, said selected time slot becoming free as soon as the slave terminal ceases transmitting; and
   reserving a time slot for a priority user terminal throughout the communication; wherein
   each slave terminal of priority user transmits in its time slot a synchronization signal different from that of the master terminal,
   a minimum priority level is assigned to each time slot when all the time slots are free time slots in the current frame, the minimum priority level being level one,
   responsive to a number of free time slots decreasing in at least one frame following the current frame due to one of the terminals being assigned to one of the free time slots, the priority level of each of the free time slots increases, and
   terminals are only assigned to free time slots having a priority level less than or equal to the priority level of the terminal.

* * * * *